UNITED STATES PATENT OFFICE.

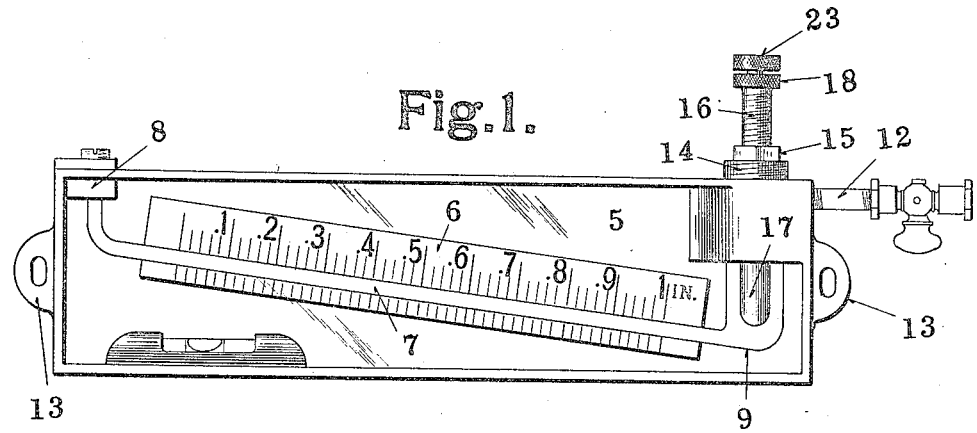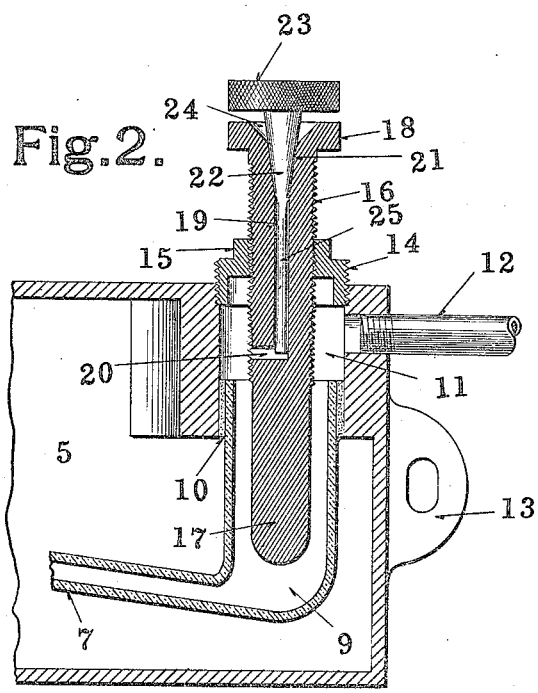

WILLIAM KEMP, OF ST. LOUIS, MISSOURI.

PRESSURE OR DRAFT GAUGE.

1,423,565. Specification of Letters Patent. Patented July 25, 1922.

Application filed November 5, 1920. Serial No. 421,830.

*To all whom it may concern:*

Be it known that I, WILLIAM KEMP, a citizen of the United States of America, residing at the city of St. Louis, State of Missouri, United States of America, have invented certain new and useful Pressure or Draft Gauges, of which the following is such a full, clear, and exact description as will enable any one skilled in the art to which it appertains to make and use the same, reference being had to the accompanying drawings, forming part of this specification.

My invention relates to a pressure or draft gauge and particularly to the means for filling the oil well and regulating the depth of oil therein.

In carrying out my invention I provide the oil well of the gauge with an adjustable plunger and form in said plunger an oil passage provided with a plug for maintaining an air tight joint. I also provide the upper end of the oil passage with an enlarged conical portion forming a filling funnel.

In the accompanying drawings which illustrate one form of my invention applied to a draft gauge of the inclined tube type, Figure 1 is a front elevation and Figure 2 is an enlarged vertical section through one end of the gauge.

5 indicates the frame of the device, secured to the rear wall of which is a scale 6 adapted to be read in connection with the inclined tube 7 of the gauge glass. This tube 7 has one end attached at 8 to the frame 5 and is provided at the other end with an enlarged portion 9 forming an oil well. The enlarged portion 9 is secured by cement 10 in a vertical cylindrical aperture or chamber 11 formed in the frame. 12 is a connecting pipe leading from the passage 11 to a smoke stack, or other place, the draft of which is to be measured. The upper end of the passage 11 is provided with internal threads engaging with external threads on a plug or cap 14. The plug 14 is preferably provided with an angular portion 15 for engagement with a wrench. The plug 14 is provided with internal threads engaging with external threads on a stem 16. The lower end 17 of this stem 16 extends into the enlarged portion 9, or oil well, of the gauge glass and forms a regulating plunger. The stem 16 is provided with a knurled head 18. Formed in the stem 16 is a vertical oil passage 19 provided with a lateral outlet 20 above the plunger 17. The upper end of the oil passage 19 terminates in a tapering portion 21 in which is a tapering plug 22 provided with knurled head 23 and adapted to form an air tight joint without the use of screw threads. The plug 22 is provided with an extension 25 forming a cleaning rod for the passage 19. The tapering part 21 of the oil passage 19 has an enlarged conical portion 24 forming a filling funnel for the oil. 13 are slotted lugs by means of which the frame 5 is secured in position.

In the operation of my device, the tapering plug 22 is removed by means of its knurled head 23 in order to fill the oil well 9 to its approximate level after which the plug 22 is replaced and the exact level of oil in the gauge glass is secured by raising or lowering the plunger 17 which is accomplished by rotating the stem 16 by means of its knurled head 18. In this way the glass may be filled without removing either the plug 14 or the stem 16 of the device.

Having fully described my invention, what I claim as new and desire to secure by Letter Patent of the United States is:

1. In a device of the class described, the combination with a gauge glass having an integral upturned portion forming an oil well, of a regulator stem projecting into said well, supporting means for said stem, said stem being provided with an oil filling passage terminating intermediate of its length, and a removable plug in said oil passage.

2. In a device of the class described, the combination with a gauge glass having an integral upturned portion forming an oil well, of a frame having a draft chamber into which said upturned portion projects, said draft chamber being provided with a draft passage, a regulator stem projecting into said well, supporting means for said stem, said stem having an oil passage therein independent of said draft passage, and a removable plug in said oil passage.

3. In a device of the class described, the combination with a gauge glass having an integral upturned portion forming an oil well, of a frame provided with a draft chamber into the lower end of which said upturned portion projects, a removable cap in the upper end of said chamber, said chamber having a draft passage communicating therewith at a point between the upturned portion and cap, a regulator stem threaded in said cap and extending into said oil well, said stem being provided with an oil filling passage and means for closing said passage.

4. In a device of the class described, the combination with a frame, a gauge glass carried thereby, an adjustable stem projecting into said glass, supporting means for said stem, said stem being provided with a longitudinal oil passage for filling the gauge glass, said oil passage terminating in a tapering inlet, a tapering plug for said inlet, and an extension carried by said plug and forming a cleaning rod for said passage.

In testimony whereof, I have hereunto set my hand and affixed my seal.

WILLIAM KEMP. [L.S.]